United States Patent
Higgs et al.

(10) Patent No.: US 8,055,817 B2
(45) Date of Patent: Nov. 8, 2011

(54) EFFICIENT HANDLING OF QUEUED-DIRECT I/O REQUESTS AND COMPLETIONS

(75) Inventors: Raymond Higgs, Poughkeepsie, NY (US); George P. Kuch, Poughkeepsie, NY (US); Bruce H. Ratcliff, Poughkeepsie, NY (US); Gustav E. Sittmann, III, Webster Groves, MO (US); Jerry W. Stevens, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 12/609,110

(22) Filed: Oct. 30, 2009

(65) Prior Publication Data

US 2011/0106990 A1    May 5, 2011

(51) Int. Cl.
*G06F 13/00* (2006.01)
*G06F 3/00* (2006.01)

(52) U.S. Cl. ............ 710/52; 710/40; 710/107; 710/244; 709/232; 370/412

(58) Field of Classification Search .................. 710/5–7, 710/29, 33–57, 107–116; 709/212–215, 709/231–232; 370/412–418
See application file for complete search history.

(56) References Cited

U.S. PATENT DOCUMENTS

| | | | |
|---|---|---|---|
| 6,345,324 B1 | 2/2002 | Baskey et al. | |
| 6,401,145 B1 | 6/2002 | Baskey et al. | |
| 2003/0208635 A1* | 11/2003 | Stevens | 709/314 |
| 2004/0080512 A1* | 4/2004 | McCormack et al. | 345/543 |
| 2004/0167961 A1* | 8/2004 | Jain et al. | 709/203 |
| 2005/0289246 A1* | 12/2005 | Easton et al. | 710/1 |
| 2010/0223392 A1* | 9/2010 | Pond et al. | 709/231 |

OTHER PUBLICATIONS

I. Adlung, et al., FCP for the IBM eServer zSeries systems: Access to distributed storage, IBM J. Res. & Dev. vol. 46 No. 4/5 Jul./Sep. 2002, 16 pages.

M.E. Baskey, et al., zSeries features for optimized sockets-based messaging: HiperSockets and OSA-Express, IBM J. Res. & Dev. vol. 46 No. 4/5 Jul./Sep. 2002, 11 pages.

* cited by examiner

*Primary Examiner* — Christopher B Shin
(74) *Attorney, Agent, or Firm* — Cantor Colburn LLP; Steven Chiu

(57) ABSTRACT

Computer program products and methods for efficient handling of queued-direct input/output (QDIO) requests and completions at an adapter in communication with an I/O device are provided. A method includes accessing a queue with one or more storage block address lists (SBALs), where each SBAL includes a plurality of storage block address list entries (SBALEs) and is associated with an SLSB. The method further includes reading an SBAL count in one of the SBALEs, where the SBAL count indicates a number of the SBALs forming an I/O request to the I/O device. In response to determining that the SBAL count is greater than one, a number of the SBALs from the queue and associated SLSBs equivalent to the SBAL count are prefetched without waiting for a notification of completion of each of the SBALs forming the I/O request, and states of the associated SLSBs transition from adapter-owned to program-owned.

23 Claims, 4 Drawing Sheets

EFFICIENT HANDLING OF QUEUED-DIRECT I/O REQUESTS AND COMPLETIONS

BACKGROUND

The present invention relates generally to computer system input/output request processing, and more specifically, to efficient handling of queued-direct input/output requests and completions.

Queued-direct-I/O (QDIO) provides a means for a program, such as an operating system, to directly and asynchronously communicate with one or more input/output devices or a network of devices by the use of data queues constructed and managed in main storage of an implementing computer system. The queues allow the communication to be performed in a predictable and efficient manner without requiring services of a centralized controlling mechanism, such as an operating system input/output supervisor, and the resulting overhead such a mechanism implies.

An adapter supporting QDIO may have 0 to N input queues and/or 0 to N output queues, where N is an arbitrary number such as 32. When QDIO input queues are used, the program can directly access data placed into the input queues by the adapter. Typically, the source of the data placed into the input queues is an I/O device or network of devices to which the adapter is connected. Correspondingly, when QDIO output queues are used, the program can transmit data directly to the adapter by placing data into appropriate output queues. Depending on the adapter, the data placed into the output queues may be used internally by the adapter or may be transmitted to one or more I/O devices to which the adapter is connected. For both QDIO input queues and QDIO output queues, main storage of the implementing computer system is used as the medium by which data is exchanged between the program and the adapter.

SUMMARY

An exemplary embodiment is a computer program product for handling of queued-direct input/output (QDIO) requests at an adapter in communication with an I/O device. The computer program product includes a storage medium readable by a processing circuit and storing instructions for execution by the processing circuit for implementing a method. The method includes accessing a queue with one or more storage block address lists (SBALs). Each SBAL includes a plurality of storage block address list entries (SBALEs) and is associated with a storage list status block (SLSB). The method further includes reading an SBAL count in one of the SBALEs, the SBAL count indicating a number of the SBALs forming an I/O request to the I/O device. In response to determining that the SBAL count is greater than one, a number of the SBALs from the queue and associated SLSBs equivalent to the SBAL count are prefetched without waiting for a notification of completion of each of the SBALs forming the I/O request, and states of the associated SLSBs are transitioned from adapter-owned to program-owned.

Another exemplary embodiment is a computer-implemented method for handling of QDIO requests at an adapter in communication with an I/O device. The method includes accessing a queue with one or more SBALs, where each SBAL includes a plurality of SBALEs and is associated with an SLSB. The method further includes reading an SBAL count in one of the SBALEs, where the SBAL count indicates a number of the SBALs forming an I/O request to the I/O device. In response to determining that the SBAL count is greater than one, a number of the SBALs from the queue and associated SLSBs equivalent to the SBAL count are prefetched without waiting for a notification of completion of each of the SBALs forming the I/O request, and states of the associated SLSBs transition from adapter-owned to program-owned.

A further exemplary embodiment is an adapter for handling QDIO requests. The adapter includes an adapter interface configured to communicate with an I/O device and a queue in a host system. The queue includes one or more SBALs, where each SBAL includes a plurality of SBALEs and is associated with an SLSB. The adapter also includes adapter logic configured to read an SBAL count in one of the SBALEs. The SBAL count indicates a number of the SBALs forming an I/O request to the I/O device. The adapter logic is further configured to prefetch a number of the SBALs from the queue and associated SLSBs equivalent to the SBAL count without waiting for a notification of completion of each of the SBALs forming the I/O request.

An additional embodiment is a computer program product for handling of QDIO requests at an adapter in communication with an I/O device. The computer program product includes a storage medium readable by a processing circuit and storing instructions for execution by the processing circuit for implementing a method. The method includes accessing a queue with one or more SBALs, where each SBAL includes a plurality of SBALEs. The method further includes reading a fragment type in multiple SBALEs of a common SBAL. The fragment type indicates whether each SBALE is a first SBALE of an I/O request to the I/O device, a middle SBALE of the I/O request, and a last SBALE of the I/O request. The method also includes locating multiple I/O requests in the common SBAL according to the fragment type in the multiple SBALEs, and processing the multiple I/O requests in the common SBAL.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the present invention provide efficient handling of queued-direct input/output (QDIO) requests and completions. QDIO can be used to reduce a number of communication steps between a program, such as an operating system, and a targeted I/O device. An adapter can place or extract content from QDIO queues in conjunction with the program. The QDIO queues provide the ability for both the program and the adapter to directly communicate with each other in an asynchronous manner that is both predictable and efficient without requiring services of a centralized controlling mechanism, such as an operating-system input/output supervisor. Input and output queues are constructed in main storage by the program and are initialized and activated at the adapter. Each queue includes multiple separate data structures, also referred to as "queue components", that collectively describe the queue characteristics and provide controls to allow the exchange of data between the program and the adapter. Exemplary embodiments, as described in greater detail herein, improve efficiency for large I/O requests and multiple small I/O requests, as well as reducing the burden associated with the completion of multiple I/O requests.

Figure 1:
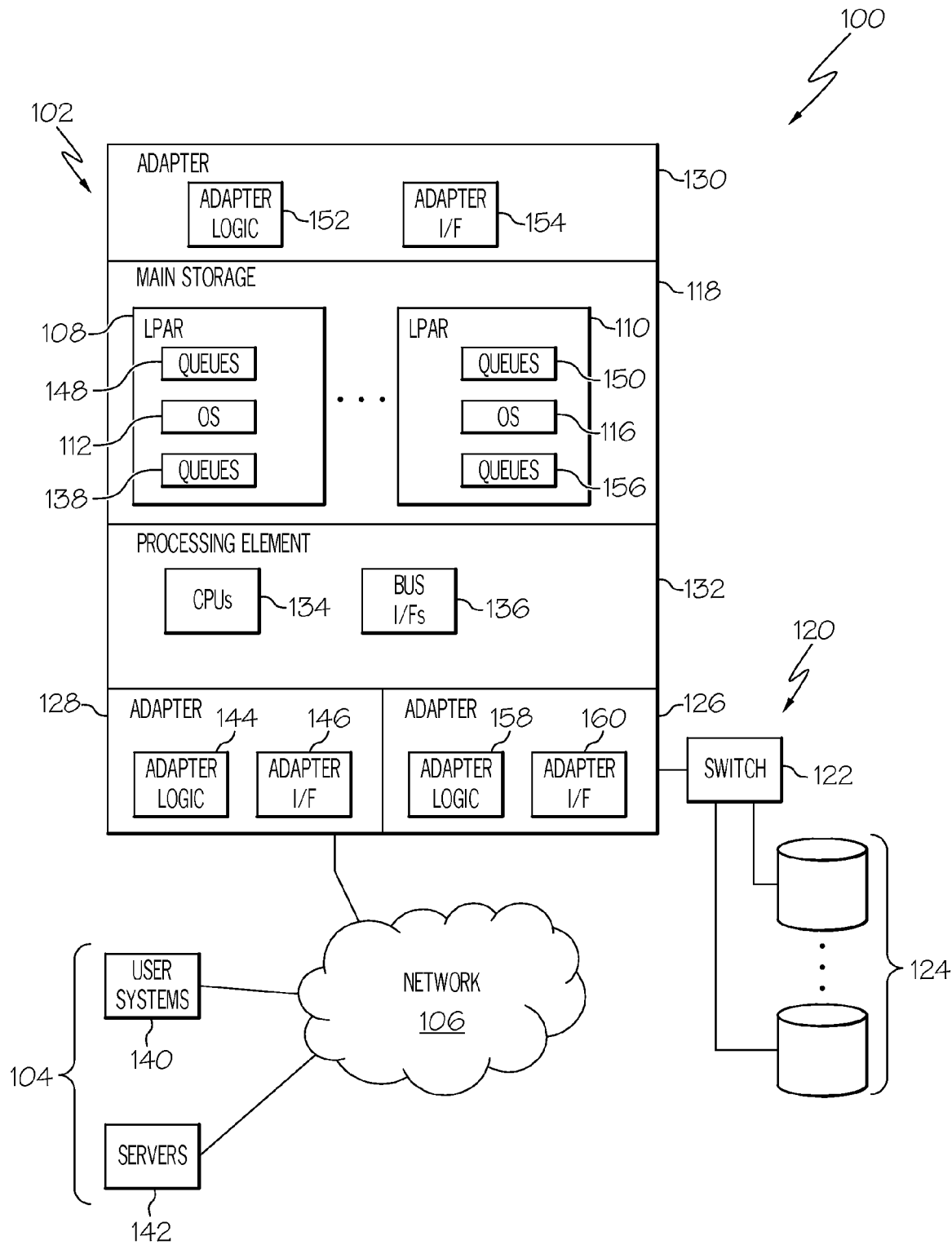
FIG. 1 depicts an example of a system in accordance with exemplary embodiments.

Turning now to the drawings, it will be seen that in FIG. 1 there is a block diagram of a system 100 upon which efficient handling of QDIO requests and completions is implemented in exemplary embodiments. The system 100 of FIG. 1 includes a host system 102 in communication with remote systems 104 over a network 106. In exemplary embodiments, the host system 102 is a high-speed processing device (e.g., a mainframe computer) including at least one processing circuit (e.g., a CPU) capable of reading and executing instructions, and handling numerous I/O requests from the remote systems 104.

The host system 102 can include multiple logical partitions (LPARs) 108 and 110 to support multiple operating systems (OSs) 112 and 116, where the OSs 112 and 116 are examples of programs that are executed by the host system 102. The LPARs 108 and 110 can function as separate virtual servers on the host system 102. The LPARs 108 and 110 may be implemented in main storage 118, where main storage 118 is computer memory for the host system 102. The host system 102 can also interface with a storage network 120. The storage network 120 can include one or more switches 122 to access one or more storage devices 124. The storage devices 124 can include a variety of I/O devices, such as one or more small computer system interface (SCSI) devices. The one or more switches 122 may also perform protocol conversion, for instance Fibre Channel Protocol (FCP) to SCSI, where the host system 102 supports FCP via adapter 126.

The host system 102 may support a number of adapters for different communication paths between the OSs 112 and 116 and other elements of the system 100. For example, adapter 128 can be used to establish a communication path between the host system 102 and the network 106. Additionally, adapter 130 supports communication between LPARs 108 and 110, and thus adapter 130 may be a totally virtual device simulated by firmware in memory.

A processing element 132 can be used to execute instructions on processing circuits (CPUs) 134 and interface with main storage 118 and adapters 126-130 via bus interface 136. The bus interface 136 can support a variety of communication protocols known in the art. For example, the bus interface 136 may support a self-timed interface (STI) bus and a peripheral controller interface (PCI) bus, in addition to other bus protocols.

The remote systems 104 may issue I/O requests for retrieval of data from storage devices 124 of storage network 120. I/O requests from remote systems 104 can be received via network 106 at adapter 128 and passed to queues 138 for further processing by OS 112. The remote systems 104 may include user systems 140, such as desktop, laptop, or general-purpose computer devices, and servers 142. The network 106 may be any type of communications network known in the art, including wireless, wired, and/or fiber optic links. Additional computer systems (not depicted) can also be accessed via the network 106 or other networks. Adapter logic 144 and an adapter interface 146 can transfer I/O requests and data to the queues 138 in main storage 118. The OS 112 can interrogate the queues 138 and determine a course of action. The OS 112 may determine that an I/O request should be generated to access the storage network 120. In this example, an I/O request is written to queues 148 of LPAR 108 and transferred to queues 150 of LPAR 110 by adapter logic 152 and adapter interface 154 of adapter 130. OS 116 transfers the I/O request to queues 156 of LPAR 110, where adapter logic 158 and adapter interface 160 transfer the I/O request to storage network 120. Completion status associated with the I/O request may follow a reverse communication flow.

In exemplary embodiments, the queues 138, 148, 150, and 156 are QDIO queues. The OSs 112 and 116 construct the queues 138, 148, 150, and 156 in main storage 118. The queues 138, 148, 150, and 156 can include input and output queues. The adapters 126-130 place data received from network 106, storage network 120, and cross-LPAR data into the queues 138, 148, 150, and 156, enabling the OSs 112 and 116 to access the data. Correspondingly, the OSs 112 and 116 can place data in the queues 138, 148, 150, and 156 for the adapters 126-130 to transmit. The adapters 126-130 and/or the OSs 112 and 116 may also internally use data placed into the queues 138, 148, 150, and 156 to provide configuration and status information. The adapters 126-130 support direct memory access (DMA) to minimize interrupts and other overhead associated with passing data and status information between the adapters 126-130 and memory allocated by the OSs 112 and 116 that is described by the queues 138, 148, 150 and 156. Each of the queues 138, 148, 150, and 156 may represent a queue set that provides for separate outbound and inbound queues. For example, each queue set can include four outbound and at least one inbound queue. Applications are assigned to at least one queue set which includes a number for input or output queues, and each queue set can share one or more of the adapters 126-130. The queue sets provide for a list of useable buffers and also a list of storage blocks for incoming/outgoing data. The buffers may be further prioritized to address specific application needs.

The OSs 112 and 116 and the adapters 126-130 use a state change signaling protocol in order to facilitate the exchange of data. This protocol is applied to each input and output data buffer associated with each active input and output queue. Both input and output buffers are managed and exchanged between the OSs 112 and 116 and the adapters 126-130 by placing buffers into various states which are maintained in a designated location that is set aside and is associated with each buffer. These states include ownership information that identifies either the program or the adapter as the controlling element of the buffer. For example, for input queues, asynchronous to the execution of the OSs 112 and 116, the adapters 126-130 place data received from an associated I/O device into input buffers that are in an input buffer empty state. For each input buffer that has data placed into it by the adapters 126-130, the state of the buffer is changed from input buffer empty, which is a I/O-adapter-owned state, to input buffer primed, which is program-owned state. At the time the adapters 126-130 change the buffer states, the adapters 126-130 may also request an I/O interruption, specifically an I/O-adapter interruption. The OSs 112 and 116 examine in sequence (such as round robin) the state of all input buffers associated with all QDIO input queues and process the data in each input buffer that is in the input buffer primed state. Upon completion of input buffer processing, the OSs 112 and 116 may change the state of the buffers to input buffer empty in order to make the buffers available for reuse by the adapters 126-130 for subsequent transactions. When the OSs 112-116 change the state of one or more input queue buffers from primed to empty, a Signal Adapter instruction may be executed in order to signal the adapters 126-130 that one or more input buffers are available for use.

Similarly, for output queues, asynchronous to the execution of the adapters 126-130, the OSs 112 and 116 may place output data into one or more QDIO output queue buffers that are in the output buffer empty state, output buffer not initialized state, or output buffer error state, which are program-owned states, and then change the state of each such buffer to the output buffer primed state, which is an adapter-owned state. At the time the adapters 126-130 change the buffer states, the adapters 126-130 may also request an I/O interruption, specifically an I/O-adapter interruption. The OSs 112 and 116 can execute a Signal Adapter instruction in order to signal the adapters 126-130 that one or more output queues have data to be transmitted. Asynchronous to the execution of the OSs 112 and 116, the adapters 126-130 transmit the data in each QDIO output buffer that is in the output buffer primed state. Upon completion of transmission, the adapters 126-130 change the state of each such buffer to the output buffer empty state in order to make the buffer available for reuse by the OSs 112 and 116.

Figure 2:
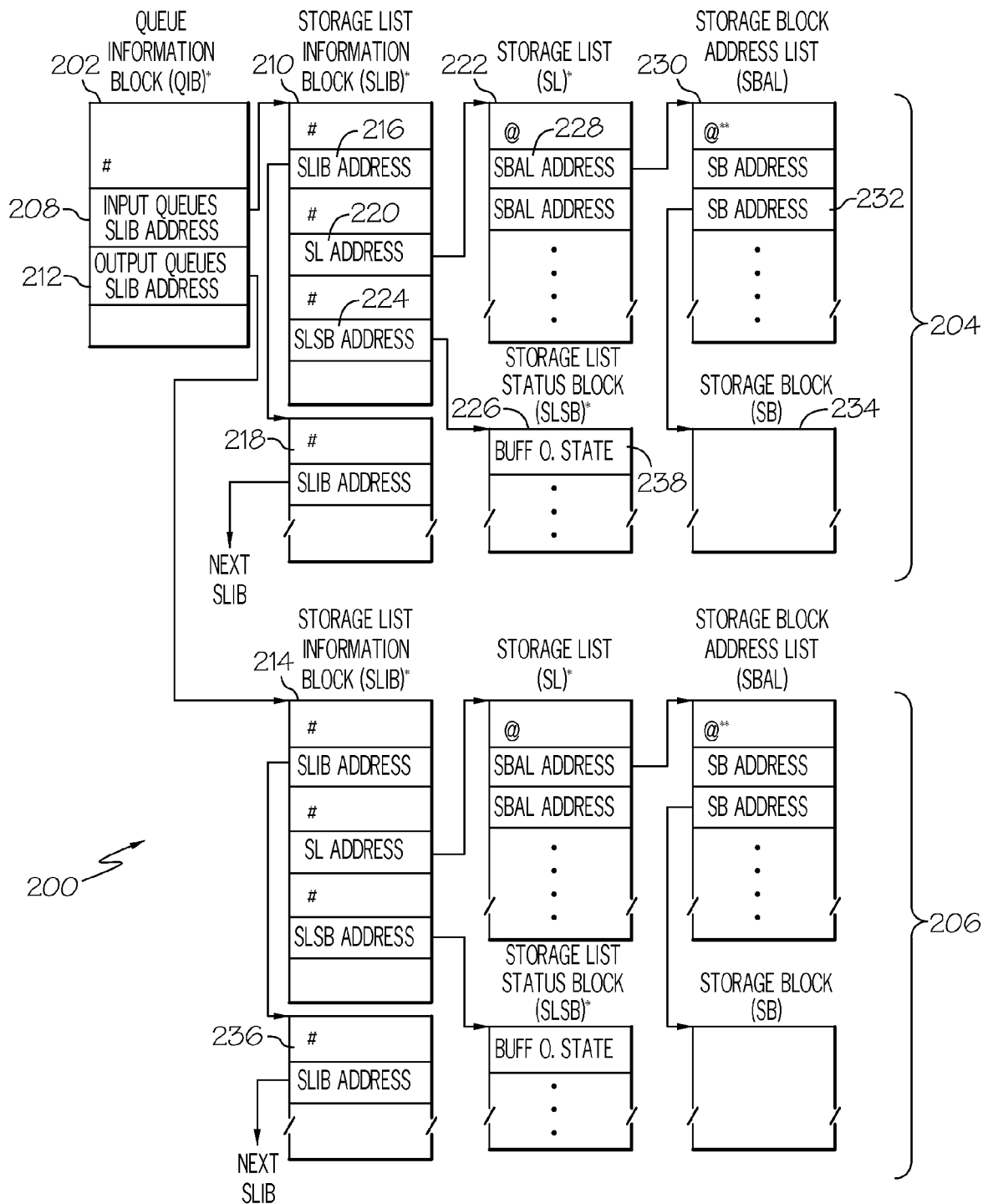
FIG. 2 depicts an example of a queuing mechanism in accordance with exemplary embodiments.

FIG. 2 depicts an example of a queuing mechanism 200 in accordance with exemplary embodiments, including multiple queue components. The queuing mechanism 200 is an embodiment that can be used to implement the queues 138, 148, 150, and 156 of FIG. 1, where each of the queues 138, 148, 150, and 156 of FIG. 1 may be a queue set of both QDIO input and output queues. A queue information block (QIB) 202 contains information about QDIO input queues 204 and QDIO output queues 206. The QIB 202 includes an input queues storage list information block (SLIB) address 208 pointing to a SLIB 210 and an output queues SLIB address 212 pointing to SLIB 214. Each SLIB 210 and 214 includes a number of pointers. For instance, the SLIB 210 includes SLIB address 216 pointing to another SLIB 218, a storage list (SL) address 220 pointing to an SL 222, and a storage list status block (SLSB) address 224 pointing to an SLSB 226. In turn, the SL 222 includes a storage block address list (SBAL) address 228 pointing to an SBAL 230. SBAL 230 includes SBAL entries (SBALEs) 232, which may point to storage blocks 234. A similar structure is used for the QDIO output queues 206. In an exemplary embodiment, there are up to 32 QDIO input queues 204 and up to 32 QDIO output queues 206 defined per QIB 202.

The SLIBs, such as SLIBs 210, 214, 218, and 236, provide for addresses of information stored pertaining to each QDIO input and output queue 204 and 206. One SL, such as SL 222, is defined for each queue which contains an entry for each QDIO-I/O buffer, that is each SBAL, associated with the queue. Collectively, the storage blocks 234 addressed by all of the entries of a single SBAL 230 constitute one of the many possible QDIO buffers of a QDIO queue. In an exemplary embodiment, there are 128 possible QDIO buffers. Each SBAL is effectively a scatter/gather list that designates up to 16 storage areas that form the I/O buffer that an adapter uses to transfer data. Therefore, the SBAL 230 is includes 16 SBALEs 232, each of which may designate a storage block 234 of the buffer.

Associated with a QDIO queue's 128 buffers is a 128-byte SLSB array of states, such as states 238. Each byte in the SLSB 226 contains the state 238 of the corresponding buffer and acts as a finite state machine for the buffer. When an SLSB indicates that the corresponding buffer is in an adapter-owned state, the adapter (e.g., adapter 126 of FIG. 1) may use the buffer to transfer data, and the program (e.g., OS 116 of FIG. 1) does not reference or change the buffer. Contrariwise, when an SLSB indicates that the corresponding buffer is in a program-owned state, the program may reference and/or change the buffer, and the adapter does not use the buffer for data transfer. So that an adapter does not have to continuously poll the SLSB states, the Signal Adapter instruction is used by the program to signal an adapter that one or more SLSBs have been changed to the adapter-owned state. In other words, Signal Adapter instruction informs the adapter that it has some work to do.

The example of FIG. 1 depicts 3 types of QDIO queues. Queues 138 are referred to as "format-0" queues, which allow adapter 128 to attach to network 106. Queues 156 are referred to as "format-1" queues for attaching adapter 126 to storage network 120. In an exemplary embodiment, the storage network 120 provides an FCP channel path for communication with SCSI I/O devices as the storage devices 124. Queues 148 and 150 are referred to as "format-2" queues, which allow adapter 130 to attach to LPARs 108 and 110 forming an internal-queued-direct-communications (IQDC) channel path. Format-2 queues are used to move information between partitions in order to provide virtual-server to virtual-server network communications (e.g., HiperSockets). Depending on the configuration, format-0, format-1, and format-2 queues may all coexist within a single logical partition.

Figure 3:
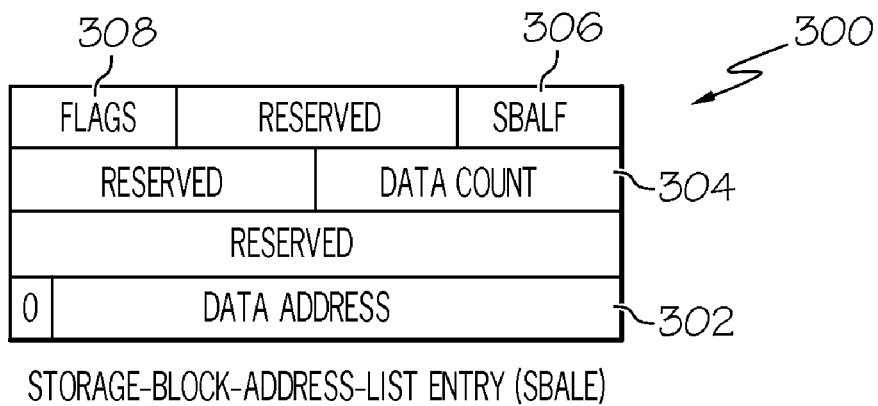
FIG. 3 depicts an example structure of a storage block address list entry in accordance with exemplary embodiments.

FIG. 3 depicts an example structure of SBALE 300. In exemplary embodiments, SBALE 300 is used for format-0 and format-2 queues. SBALE 300 includes a data address 302 pointing to a storage block location, e.g., storage block 234. SBALE 300 also includes a data count 304 to indicate an amount of data to read or write at the data address 302. SBALE 300 further includes SBAL flags (SBALF) 396 and flags 308 that serve as status indicators.

Figure 4:
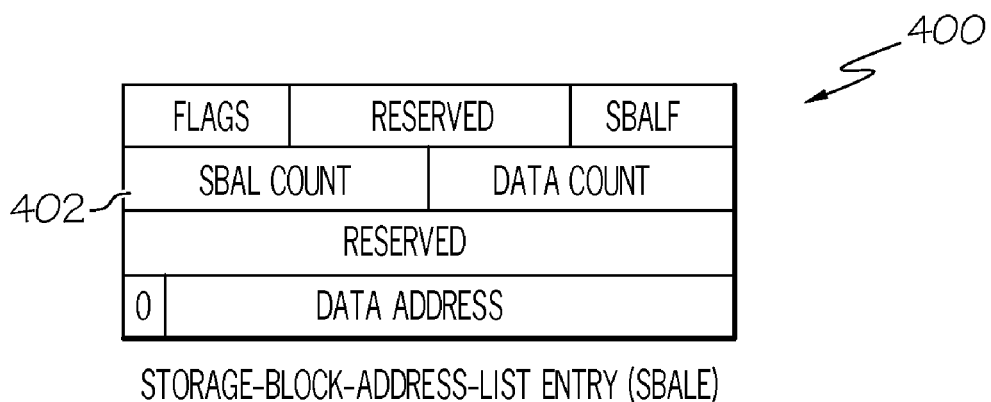
FIG. 4 depicts another example structure of a storage block address list entry in accordance with exemplary embodiments.

For format-1 queues, a single I/O request may include multiple buffers. If the SBALE 300 is used for format-1 queues, the OS 116 of FIG. 1 can signify that a single I/O request includes multiple buffers by specifying a buffer-sequence type (first-SBAL, middle-SBAL, or last-SBAL) of each of the SBALs that make up the I/O request. The OS 116 also simultaneously changes the SLSBs of all of the buffers that make up the I/O request to the adapter-owned state before issuing a Signal Adapter instruction. In order to determine how many SBALS make up the I/O request, the adapter 126 examines the SBAL buffer-sequence types and SLSBs in tandem as it processes each buffer. However, using SBALE 300 for format-1 queues limits throughput of the system 100. In an exemplary embodiment, SBALE 400 of FIG. 4 is used for format-1 queues. SBALE 400 adds an SBAL count 402. The SBAL count 402 may be defined in the first SBALE of a command to specify a subsequent number of SBALS that form the I/O request. The SBAL count 402 allows the adapter 126 to efficiently prefetch all of the SBALS and SLSBs that form the I/O request. In other words, the adapter 126 does not have to process the SBAL/SLSB pairs in a single-step fashion, and prefetching proceeds without waiting for a notification of completion of each of the SBALs forming the I/O request.

For format-1 queues, the output queue is effectively a request queue because both input and output I/O requests may be specified in output queues 206 of FIG. 2. The adapter 126 of FIG. 1 is effectively a completion queue because it can use input queues 204 of FIG. 2 to record the completion of I/O requests. When multiple "small" I/O requests (e.g., an I/O request that uses only 4 of 16 SBALEs in an SBAL) are made, the OS 116 of FIG. 1 may specify each of these requests in its own SBAL and change the corresponding SLSBs to the adapter-owned state before issuing the Signal Adapter instruction. To improve efficiency for multiple small I/O requests, the queues 156 of FIG. 1 can be implemented as "format-3" queues. Format-3 queues are similar to format-1 queues in that can be used with adapters that attach to FCP channel paths, such as adapter 126 of FIG. 1.

Figure 5:
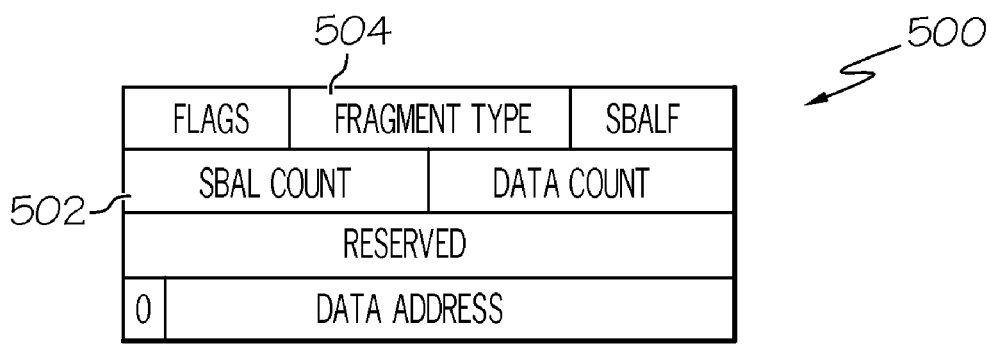
FIG. 5 depicts a further example structure of a storage block address list entry in accordance with exemplary embodiments.

FIG. 5 depicts an example structure of SBALE 500 in accordance with exemplary embodiments. Similar to SBALE 400 of FIG. 4, SBALE 500 of FIG. 5 can include an SBAL count 502; however, SBALE 500 also includes a fragment type 504. The fragment type 504 allows the OS 116 to specify in each SBALE 500, whether it is the first, middle, or last SBALE of an I/O request. Thus, multiple small I/O requests may be packed into a single SBAL, rather than distributed over multiple SBALs. Part of the information that constitutes a format-1 and format-3 I/O request is a queue-transfer-control block (QTCB). The QTCB specifies a targeted I/O device for the I/O request. Thus, when using the packing multiple I/O requests into a single SBAL, multiple I/O targets may be specified to direct the multiple I/O requests separately to multiple I/O devices.

For format-1 queues and format-3 queues, the adapter 126 of FIG. 1 records the completion of I/O requests in the input queues 204 of FIG. 2. A single SBALE can be used to record a successful completion. When the adapter 126 of FIG. 1 records a completion in the first SBALE of an input-queue SBAL, it changes the associated SLSB to the program-owned state. Thus, 15 of the 16 SBALEs in the SBAL are unused. As a further efficiency for completions, the adapter 126 of FIG. 1 may record or pack the completion of multiple successful I/O requests into subsequent SBALEs of an input-queue SBAL before changing the SLSB for the buffer to the adapter-owned state. Therefore, the time to receive a notification of multiple successful I/O requests can be reduced.

To facilitate reporting of errors when using SBALE 400 of FIG. 4 or SBALE 500 of FIG. 5, a deferred error can be reported. The deferred error is used to delay error checking until after performing the prefetching of the SBALs forming the I/O request. The deferred error also allows the adapter 126 of FIG. 1 to place the buffers back into the program-owned state before actually doing any error checking. This allows the program to reuse the SBALs, but not the storage blocks that were designated by the SBALS. The adapter 126 has internalized copies of the SBALs. In response to detecting an error, the adapter 126 can store a description of the error in a next available SBAL in an input queue of the queues 156 from the internalized copies of the SBALs. The adapter 126 may also store a copy of the SBALs forming the I/O request from the output queue into subsequent SBALs in the input queue following the description of the error in the queues 156. The copy of the SBALs may be logged for troubleshooting purposes.

Figure 6:
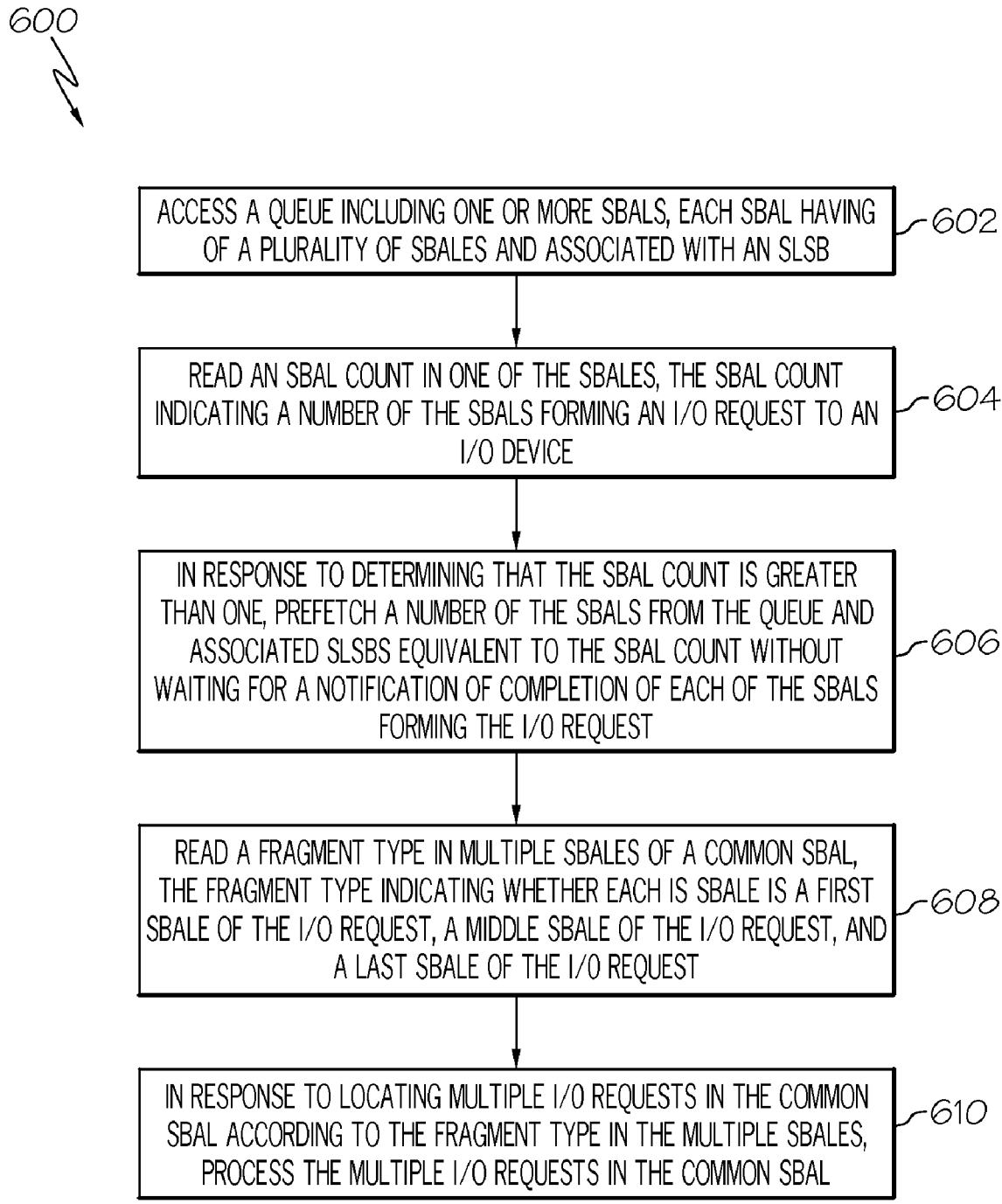
FIG. 6 depicts an exemplary process for efficient handling of queued-direct input/output requests and completions in accordance with exemplary embodiments.

Turning now to FIG. 6, a process 600 for efficient handling of QDIO requests and completions will now be described in accordance with exemplary embodiments, and in reference to FIGS. 1-5. At block 602, adapter logic 158 of adapter 126 accesses queues 156 via adapter interface 160. As previously described and depicted in FIG. 2, the queues 156 include one or more SBALs 230, each SBAL 230 having of a plurality of SBALEs 232 and associated with an SLSB 226. At block 604, the adapter logic 158 reads an SBAL count 402 or 502 in one of the SBALEs 232 formatted as SBALE 400 or SBALE 500. The SBAL count 402 or 502 indicates a number of the SBALs 230 forming an I/O request to an I/O device, such as one of the storage devices 124.

At block 606, in response to determining that the SBAL count 402 or 502 is greater than one, the adapter logic 158 prefetches a number of the SBALs 230 from the queues 156 and associated SLSBs 226 equivalent to the SBAL count 402 or 502 without waiting for a notification of completion of each of the SBALs 230 forming the I/O request. The adapter logic 158 processes the SBALs 230 to initiate the requested I/O operation for the I/O device. Deferred error checking can also be performed by the adapter logic 158 as previously described.

At block 608, if the queue being processed is a format-3 queue, the adapter logic 158 reads fragment type 504 in multiple SBALEs 232 of a common SBAL 230. The fragment type 504 indicates whether each is SBALE 232 is a first SBALE of the I/O request, a middle SBALE of the I/O request, and a last SBALE of the I/O request.

At block 610, in response to locating multiple I/O requests in the common SBAL 230 according to the fragment type 504 in the multiple SBALEs 232, the adapter logic 158 processes the multiple I/O requests in the common SBAL 230. For example, the multiple I/O requests can be read and write I/O operations to various storage devices 124. The adapter logic 158 may also pack completion status of the multiple I/O requests into subsequent SBALEs 232 of an SBAL 230 in an input queue of the queues 156 prior to changing the associated SLSB state 238 to an adapter-owned state.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution to implement the adapter logic 144, 152, and 158 of FIG. 1. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include using an adapter to manage queues and handle a stream of multiple buffers. To increase efficiency on larger queued command sequences, a buffer count field can be included in the first entry of a command to enable prefetching multiple storage block address lists that form the command. To improve efficiency on smaller I/O requests, rather than assigning the smaller I/O requests to separate output queue storage block address lists, the system enables a program to specify multiple smaller I/O requests in a single output queue storage block address list. Packing of I/O completions in specially formatted storage block address lists provides for more efficient recording of I/O completions by the adapter as well as more efficient handling of the completions by the program. The efficiencies can include an increased number of I/O operations per second.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer program product for handling of queued-direct input/output (QDIO) requests at an adapter in communication with an I/O device, the computer program product comprising:
    a storage medium readable by a processing circuit and storing instructions for execution by the processing circuit for implementing a method, the method comprising:
        accessing a queue comprising one or more storage block address lists (SBALs), each SBAL comprised of a plurality of storage block address list entries (SBALEs) and associated with a storage list status block (SLSB);
        reading an SBAL count in one of the SBALEs, the SBAL count indicating a number of the SBALs forming an I/O request to the I/O device; and
        in response to determining that the SBAL count is greater than one, prefetching a number of the SBALs from the queue and associated SLSBs equivalent to the SBAL count without waiting for a notification of completion of each of the SBALs forming the I/O request, and transitioning states of the associated SLSBs from adapter-owned to program-owned.

2. The computer program product of claim 1 wherein the SBAL count is located in a first SBALE of a first SBAL forming the I/O request.

3. The computer program product of claim 1 wherein the queue is an output queue of a queue set, and the method further comprises:
    checking for an error after performing the prefetching of the SBALs forming the I/O request;
    in response to detecting the error, storing a description of the error in a next available SBAL in an input queue of the queue set; and
    storing a copy of the prefetched SBALs forming the I/O request from the output queue into subsequent SBALs in the input queue following the description of the error.

4. The computer program product of claim 1 wherein the queue is stored in main storage of a host system and the queue is modified by a program executing on the host system, and further wherein the adapter accesses the queue in response to a signal adapter instruction issued by the program to indicate an adapter-owned state in one or more of the SLSBs.

5. The computer program product of claim 1 wherein the method further comprises:
    reading a fragment type in multiple SBALEs of a common SBAL, the fragment type indicating whether each SBALE is a first SBALE of the I/O request, a middle SBALE of the I/O request, and a last SBALE of the I/O request; and
    in response to locating multiple I/O requests in the common SBAL according to the fragment type in the multiple SBALEs, processing the multiple I/O requests in the common SBAL.

6. The computer program product of claim 5 wherein the adapter is in communication with multiple I/O devices, and the method further comprises:
    directing the multiple I/O requests separately to the multiple I/O devices.

7. The computer program product of claim 5 wherein the queue is an output queue of a queue set, and the method further comprises:
    packing completion status of the multiple I/O requests into subsequent SBALEs of an SBAL in an input queue of the queue set prior to changing the associated SLSB to an adapter-owned state.

8. A computer-implemented method for handling of queued-direct input/output (QDIO) requests at an adapter in communication with an I/O device, comprising:
    accessing a queue comprising one or more storage block address lists (SBALs), each SBAL comprised of a plurality of storage block address list entries (SBALEs) and associated with a storage list status block (SLSB);
    reading an SBAL count in one of the SBALEs, the SBAL count indicating a number of the SBALs forming an I/O request to the I/O device; and
    in response to determining that the SBAL count is greater than one, prefetching a number of the SBALs from the queue and associated SLSBs equivalent to the SBAL count without waiting for a notification of completion of each of the SBALs forming the I/O request, and transitioning states of the associated SLSBs from adapter-owned to program-owned.

9. The method of claim 8 wherein the SBAL count is located in a first SBALE of a first SBAL forming the I/O request.

10. The method of claim 8 wherein the queue is an output queue of a queue set, and the method further comprises:
    checking for an error after performing the prefetching of the SBALs forming the I/O request;
    in response to detecting the error, storing a description of the error in a next available SBAL in an input queue of the queue set; and
    storing a copy of the prefetched SBALs forming the I/O request from the output queue into subsequent SBALs in the input queue following the description of the error.

11. The method of claim 8 wherein the queue is stored in main storage of a host system and the queue is modified by a program executing on the host system, and further wherein the adapter accesses the queue in response to a signal adapter instruction issued by the program to indicate an adapter-owned state in one or more of the SLSBs.

12. The method of claim 8 further comprising:
    reading a fragment type in multiple SBALEs of a common SBAL, the fragment type indicating whether each SBALE is a first SBALE of the I/O request, a middle SBALE of the I/O request, and a last SBALE of the I/O request; and
    in response to locating multiple I/O requests in the common SBAL according to the fragment type in the multiple SBALEs, processing the multiple I/O requests in the common SBAL.

13. The method of claim 12 wherein the adapter is in communication with multiple I/O devices, and the method further comprises:
    directing the multiple I/O requests separately to the multiple I/O devices.

14. The method of claim 12 wherein the queue is an output queue of a queue set, and the method further comprises:

packing completion status of the multiple I/O requests into subsequent SBALEs of an SBAL in an input queue of the queue set prior to changing the associated SLSB to an adapter-owned state.

15. An adapter for handling queued-direct input/output (QDIO) requests, comprising:
an adapter interface configured to communicate with an I/O device and a queue in a host system, the queue comprising one or more storage block address lists (SBALs), each SBAL comprised of a plurality of storage block address list entries (SBALEs) and associated with a storage list status block (SLSB); and
adapter logic configured to read an SBAL count in one of the SBALEs, the SBAL count indicating a number of the SBALs forming an I/O request to the I/O device, and the adapter logic is further configured to prefetch a number of the SBALs from the queue and associated SLSBs equivalent to the SBAL count without waiting for a notification of completion of each of the SBALs forming the I/O request.

16. The adapter of claim 15 wherein the SBAL count is located in a first SBALE of a first SBAL forming the I/O request.

17. The adapter of claim 15 wherein the queue is an output queue of a queue set, and the adapter logic is further configured to perform:
checking for an error after performing the prefetching of the SBALs forming the I/O request;
in response to detecting the error, storing a description of the error in a next available SBAL in an input queue of the queue set; and
storing a copy of the prefetched SBALs forming the I/O request from the output queue into subsequent SBALs in the input queue following the description of the error.

18. The adapter of claim 15 wherein the queue is stored in main storage of the host system and the queue is modified by a program executing on the host system, and further wherein the adapter logic is configured to access the queue in response to a signal adapter instruction issued by the program to indicate an adapter-owned state in one or more of the SLSBs.

19. The adapter of claim 15 wherein the adapter logic is further configured to perform:
reading a fragment type in multiple SBALEs of a common SBAL, the fragment type indicating whether each SBALE is a first SBALE of the I/O request, a middle SBALE of the I/O request, and a last SBALE of the I/O request; and
in response to locating multiple I/O requests in the common SBAL according to the fragment type in the multiple SBALEs, processing the multiple I/O requests in the common SBAL.

20. The adapter of claim 19 wherein the queue is an output queue of a queue set, and the adapter logic is further configured to perform:
packing completion status of the multiple I/O requests into subsequent SBALEs of an SBAL in an input queue of the queue set prior to changing the associated SLSB to an adapter-owned state.

21. A computer program product for handling of queued-direct input/output (QDIO) requests at an adapter in communication with an I/O device, the computer program product comprising:
a storage medium readable by a processing circuit and storing instructions for execution by the processing circuit for implementing a method, the method comprising:
accessing a queue comprising one or more storage block address lists (SBALs), each SBAL comprised of a plurality of storage block address list entries (SBALEs);
reading a fragment type in multiple SBALEs of a common SBAL, the fragment type indicating whether each SBALE is a first SBALE of an I/O request to the I/O device, a middle SBALE of the I/O request, and a last SBALE of the I/O request;
locating multiple I/O requests in the common SBAL according to the fragment type in the multiple SBALEs; and
processing the multiple I/O requests in the common SBAL.

22. The computer program product of claim 21 wherein the adapter is in communication with multiple I/O devices, and the method further comprises:
directing the multiple I/O requests separately to the multiple I/O devices.

23. The computer program product of claim 21 wherein the queue is an output queue of a queue set, and the method further comprises:
packing completion status of the multiple I/O requests into subsequent SBALEs of an SBAL in an input queue of the queue set prior to changing an associated storage list status block (SLSB) to an adapter-owned state.

* * * * *